(12) United States Patent
Chen et al.

(10) Patent No.: US 8,654,206 B2
(45) Date of Patent: Feb. 18, 2014

(54) APPARATUS AND METHOD FOR GENERATING HIGH DYNAMIC RANGE IMAGE

(75) Inventors: Shuei-Lin Chen, Kaohsiung (TW); Hong-Long Chou, Taipei (TW); Chia-Chun Tseng, Hsinchu (TW)

(73) Assignee: Altek Corporation, Hsinchu (TW)

( * ) Notice: Subject to any disclaimer, the term of this patent is extended or adjusted under 35 U.S.C. 154(b) by 1 day.

(21) Appl. No.: 13/473,011

(22) Filed: May 16, 2012

(65) Prior Publication Data

US 2013/0250136 A1 Sep. 26, 2013

(30) Foreign Application Priority Data

Mar. 20, 2012 (TW) .............................. 101109426 A

(51) Int. Cl.
*H04N 5/228* (2006.01)
(52) U.S. Cl.
USPC ................. 348/222.1; 348/218.1; 348/333.11
(58) Field of Classification Search
USPC .......... 348/218.1, 222.1, 239, 333.05, 333.11
See application file for complete search history.

(56) References Cited

U.S. PATENT DOCUMENTS

| 2004/0150641 | A1* | 8/2004 | Duiker ........................... 345/426 |
| 2011/0211732 | A1* | 9/2011 | Rapaport ...................... 382/107 |
| 2012/0081679 | A1* | 4/2012 | Matsumoto ..................... 353/98 |
| 2012/0249844 | A1* | 10/2012 | Saito et al. ..................... 348/242 |
| 2012/0293607 | A1* | 11/2012 | Bhogal et al. ................. 348/239 |

* cited by examiner

*Primary Examiner* — Gevell Selby
(74) *Attorney, Agent, or Firm* — Muncy, Geissler, Olds & Lowe, PLLC

(57) ABSTRACT

The present invention discloses an image pickup device, an image preview system and an image preview method thereof. The image pickup device comprises an image pickup module, an image processing module and a display module. The image pickup module is arranged for capturing a plurality of images. The image processing module is arranged for scaling down pixels of each image to generate a plurality of adjusted images, and combining the plurality of adjusted images to generate a preview image. The display module is arranged for displaying the preview image. Wherein, the image processing module is arranged for rendering a high dynamic range image according to the plurality of images while the plurality of adjusted images is blended.

12 Claims, 4 Drawing Sheets

APPARATUS AND METHOD FOR GENERATING HIGH DYNAMIC RANGE IMAGE

CROSS-REFERENCE TO RELATED APPLICATION

This application claims the benefit of Taiwan Patent Application No. 101109426, filed on Mar. 20, 2012, in the Taiwan Intellectual Property Office, the disclosure of which is incorporated herein in its entirety by reference.

BACKGROUND OF THE INVENTION

1. Field of the Invention

The present invention relates to an image pickup device, an image preview system, and an image preview method thereof, and more particularly to the image pickup device, and the image preview system and method capable of previewing a high dynamic range image.

2. Description of Related Art

At present, most people use image pickup devices such as digital cameras and cell phone having cameras to capture wonderful memories of their life. As science and technology advance, the present existing image pickup devices not only have a general imaging technology, but also a high dynamic range imaging (HDRI) technology to provide a rich real scene.

In general, an image captured by a general image pickup device is usually a static image which cannot reproduce the real-life scene observed by human eyes. This is due to the dynamic range expressed by an image with a single exposure value is much smaller than the dynamic range of the real image. To overcome this problem, algorithms of blending several images with different exposure values are introduced. The algorithms of blending images with different exposure values into one high dynamic range image (HDRI) solve the problem of the image with a single exposure value having a too-small dynamic range and produce a color gradient much smaller than those human eyes can see.

However, after a user takes pictures by using a conventional image pickup with the HDRI technology, the image pickup device processes the images based on the original size of the complete images. The images are blended to form the high dynamic range image first and then a corresponding image with small size is produced for being displayed on a screen and provided for the user's review. During the process, the user has to wait for a longer time before seeing the captured image, and thus lowering the convenience of use significantly.

SUMMARY OF THE INVENTION

In view of the aforementioned problems of the prior art, it is a primary objective of the invention to provide an image pickup device, an image preview system, and an image preview method thereof to overcome the problem of the conventional image pickup device that requires a longer waiting time for the HDRI preview image.

To achieve the foregoing objective, the present invention provides an image pickup device comprising an image pickup module, an image processing module and a display module. The image pickup module captures a plurality of images. The image processing module scales down pixels of each image to generate a plurality of adjusted images and blends the plurality of adjusted images to generate a preview image. The display module displays the preview image. Wherein, the image processing module blends the plurality of images to form a high dynamic range image after the plurality of adjusted images is blended.

Preferably, each image has a different exposure value.

Preferably, the image processing module further performs a tone reproduction operation of the preview image and the high dynamic range image, after blending and generating the preview image and the high dynamic range image.

Preferably, the image processing module further performs an image rendering operation of the preview image and the high dynamic range image, after blending and generating the preview image and the high dynamic range image.

Preferably, the image pickup device of present invention further comprises a memory module for selectively saving the high dynamic range image.

To achieve the foregoing objective, the present invention further provides an image preview system applied in an image pickup device, and the image preview system comprises an image adjusting module and an image blending module. The image adjusting module scales down pixels of each image to generate a plurality of adjusted images, after an image pickup module of the image pickup device captures a plurality of images. The image blending module blends the plurality of adjusted images to generate a preview image to be displayed by a display module of the image pickup device. Wherein, after the image blending module blends the plurality of adjusted images, the plurality of images is blended to generate a high dynamic range image.

Preferably, the image preview system of the present invention further comprises an image tone reproduction module that performs a tone reproduction operation of the preview image and the high dynamic range image, after the image blending module blends and generates the preview image and the high dynamic range image.

Preferably, the image preview system of the present invention further comprises an image rendering module that performs an image rendering operation of the preview image and the high dynamic range image, after the tone reproduction operation of the preview image and the high dynamic range image takes place.

To achieve the foregoing objective, the present invention further provides an image preview method comprising the steps of: capturing a plurality of images by an image pickup module; using an image processing module to scaling down pixels of each image to generate a plurality of adjusted images; using the image processing module to blend the plurality of adjusted images to generate a preview image; and displaying the preview image by a display module; thereby, after the image processing module blends the plurality of adjusted images, the plurality of images is blended to generate a high dynamic range image.

In summation, the image pickup device and the image preview system and method of the present invention scales down the data of an image captured by a user, and then blend the image to generate a HDRI preview image for the user's review during the image processing process. While the user reviews the HDRI preview image, the image pickup device blends the image of the original size to generate an original HDRI image and stores the HDRI image, so as to reduce the time for the user to review the HDRI preview image after capturing the image and improve the convenience of use.

DETAILED DESCRIPTION OF THE PREFERRED EMBODIMENTS

The technical contents and characteristics of the present invention will be apparent with the detailed description of a preferred embodiment accompanied with related drawings as follows. For simplicity, same numerals are used in the following preferred embodiment to represent respective same elements.

Figure 1:
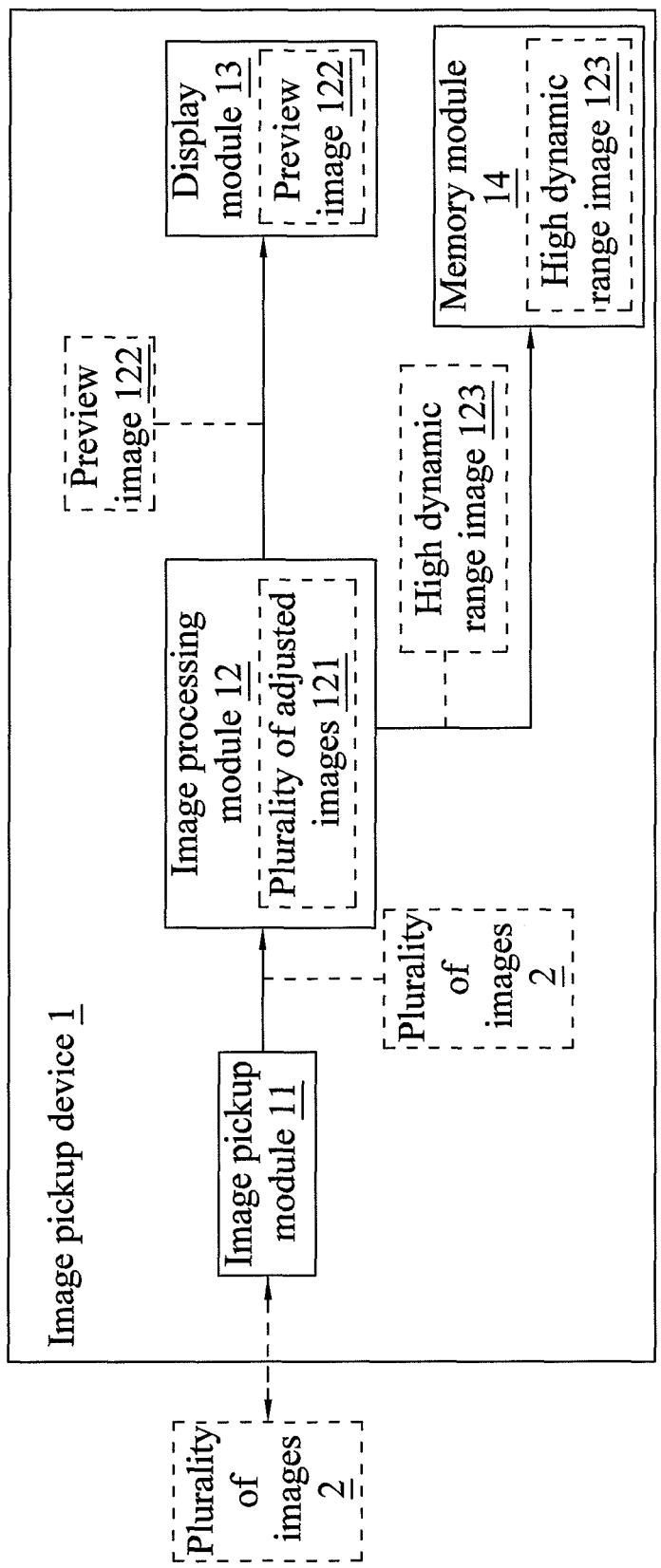
FIG. 1 is a block diagram of an image pickup device of the present invention.

With reference to FIG. 1 for a block diagram of an image pickup device of the present invention, the image pickup device 1 comprises an image pickup module 11, an image processing module 12, a display module 13 and a memory module 14. The image processing module 12 is electrically coupled to the image pickup module 11, the display module 13 and the memory module 14. The image pickup device 1 can be a digital camera, a Smartphone camera, or any device with an image capturing function. The image pickup module 11 includes a camera and an image sensor. The image processing module 12 can be a processor, an image processing software or an algorithm. The display module 13 can be a liquid crystal display (LCD) or light emitting diode (LED) screen. The memory module 14 can be a built-in memory or an external memory card. All of the aforementioned components are used as an example for the purpose of illustrating the preferred embodiments only, but not intended for limiting the scope of the invention.

In the description above, the image pickup device 1 adopts the HDRI technology, such that when a user takes a picture by using the image pickup device 1, the user can capture a plurality of images 2 by the image pickup module 11 first, and then the image processing module 12 scales down pixels of each image 2 to generate a plurality of adjusted images 121, and blends the plurality of adjusted images 121 to generate a preview image 122. The display module 13 displays the preview image 122. After the image processing module 12 blends and generates the plurality of adjusted images 121, the image processing module 12 blends the plurality of images 2 with the original data to generate a high dynamic range image 123, and the user selectively stores the high dynamic range image 123 into the memory module 14. Therefore, pixels of each image 2 can be compressed and then blended to allow the user to view the result of the captured image quickly, so as to reduce the waiting time. Wherein, each image 2 has a different exposure value.

Wherein, the image processing module 12 performs a tone reproduction operation on the preview image 122 and the high dynamic range image 123, after the image processing module 12 blends and generates the preview image 122 or the high dynamic range image 123. In addition, the image processing module 12 performs an image rendering operation on the preview image 122 and the high dynamic range image 123 after the image processing module 12 blends and generates the preview image 122 or the high dynamic range image 123, or after the tone reproduction of the preview image 122 or the high dynamic range image 123 is performed.

Wherein, the technique used by the image pickup device 1 of the present invention to achieve the quick image preview function is not just applicable for the HDRI technology only, but also applicable for the general image pickup. The example used here is provided for illustrating the application of the invention only, but not intended for limiting the scope of the invention. In addition, the image processing procedure adopted by the image processing module 12 of the present invention is not just applicable after capturing the image 2 by the image pickup module 11 only, but it is also applicable for performing the image processing operation after the image data are retrieved from the memory module 14.

Figure 2:
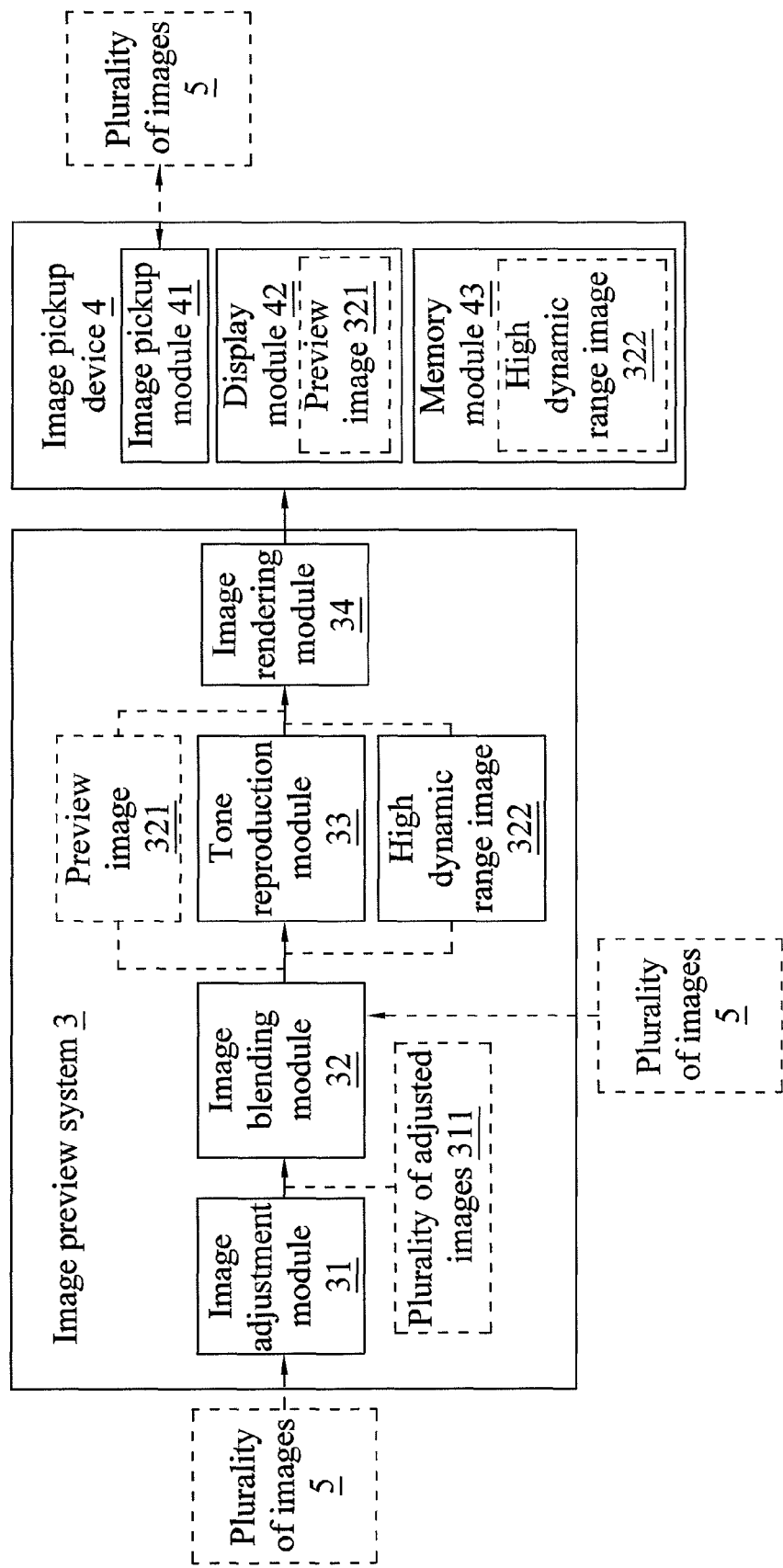
FIG. 2 is a block diagram of an image pickup device and its image preview system of the present invention.

With reference to FIG. 2 for a block diagram of an image pickup device and its image preview system of the present invention, the image preview system 3 is applied in an image pickup device 4. The image preview system 3 can be processor chip or image processing software and comprises an image adjusting module 31, an image blending module 32, an image tone reproduction module 33 and an image rendering module 34. The image blending module 32 is coupled to the image adjusting module 31 and the image tone reproduction module 33, and the image tone reproduction module 33 is coupled to the image rendering module 34. The image pickup device 4 comprises an image pickup module 41, a display module 42 and a memory module 43. The image pickup module 41 includes a camera and an image sensor. The display module 42 can be a light emitting diode (LED) or liquid crystal display (LCD) screen. The memory module 43 can be a built-in memory or an external memory card.

Wherein, after the image pickup device 4 is turned on, and the image pickup module 41 captures a plurality of images 5, the image adjusting module 31 receives each image 5 and scales down pixels of each image 5 to generate a plurality of adjusted images 311. The image blending module 32 receives the plurality of adjusted images 311 and blends each adjusted image 311 into a preview image 321. The image tone reproduction module 33 receives the preview image 321 and executes a tone reproduction operation, while the image blending module 32 starts blending each image 5 to generate a high dynamic range image 322. When the image rendering module 34 receives the preview image 321 processed by the tone reproduction and executes an image rendering operation, the image tone reproduction module 33 receives the high dynamic range image 322 and performs the tone reproduction. Finally, after the preview image 321 is processed by the image rendering, and the preview image 321 is displayed on the display module 42, the image rendering module 34 receives the high dynamic range image 322 and performs the image rendering, and then the memory module 43 selectively stores the high dynamic range image 322. Compared with the conventional method of blending the image data of the original file size and then scaling down the image data and finally blending and displaying the image, the present invention allows users to view the HDRI preview image quickly to reduce the waiting time.

Wherein, when the image blending module 32, the image tone reproduction module 33 and the image rendering module 34 of the image preview system 3 generates the preview image 321 or performs the tone reproduction or image rendering operation of the preview image 321, the image blending module 32, the image tone reproduction module 33 and the image rendering module 34 start blending each image 5 of the original file size or performing the tone reproduction or image rendering operation of the high dynamic range image 322. In other words, if one of the modules executes a procedure and continues to execute the next procedure, the image processing speed can be increased by carrying out these procedures simultaneously and such image processing method is simply an exemplary embodiment, and the image preview system 3 also can start execute each image processing operation after each module has processed the preview image 321 and displayed the preview image 321 on the display module 42 for the user's review.

Figure 3:
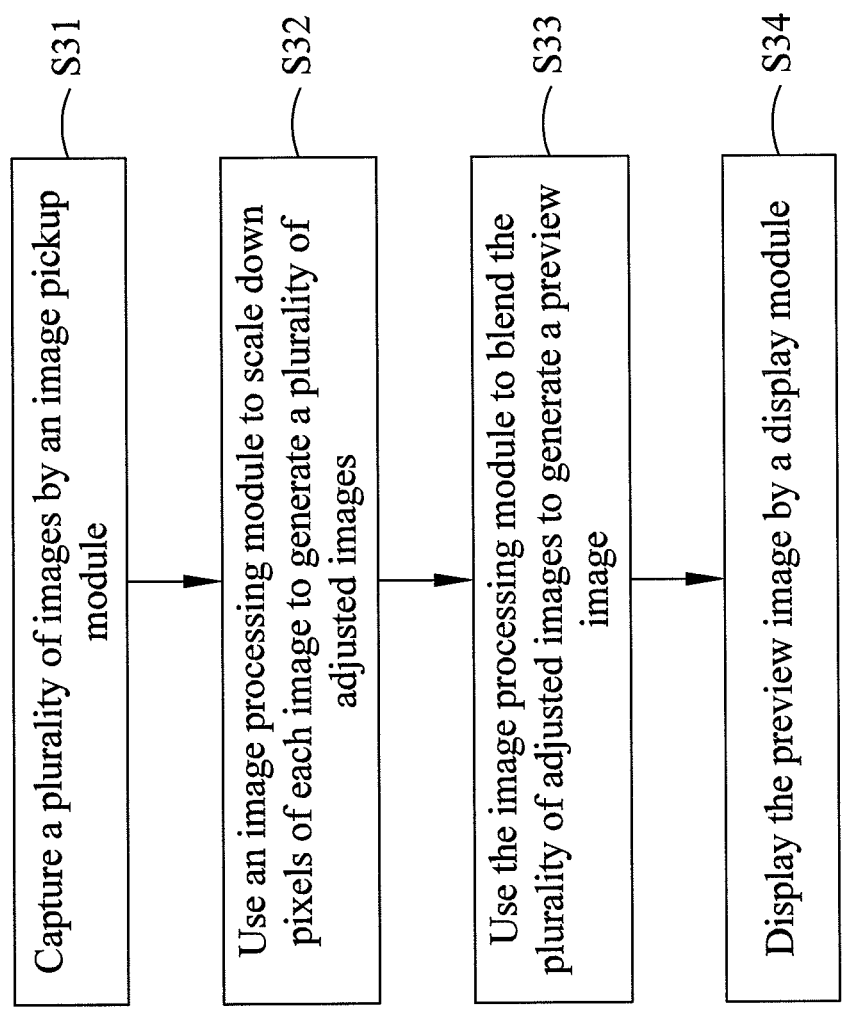
FIG. 3 is a flow chart of an image preview method of the present invention.

With reference to FIG. 3 for a flow chart of an image preview method of the present invention, the method comprises the following steps:

S31: Capture a plurality of images by an image pickup module.

S32: Use an image processing module to scale down pixels of each image to generate a plurality of adjusted images.

S33: Use the image processing module to blend the plurality of adjusted images to generate a preview image.

S34: Display the preview image by a display module. Wherein, if each adjusted image blended by the image processing module is a preview image, then each image of the original file size will be blended to form a high dynamic range image; or if the display module displays the preview image, the image processing module will start blending each image of the original file size and stores each image. The aforementioned image method allows users to quickly view the images captured by the users.

Figure 4:
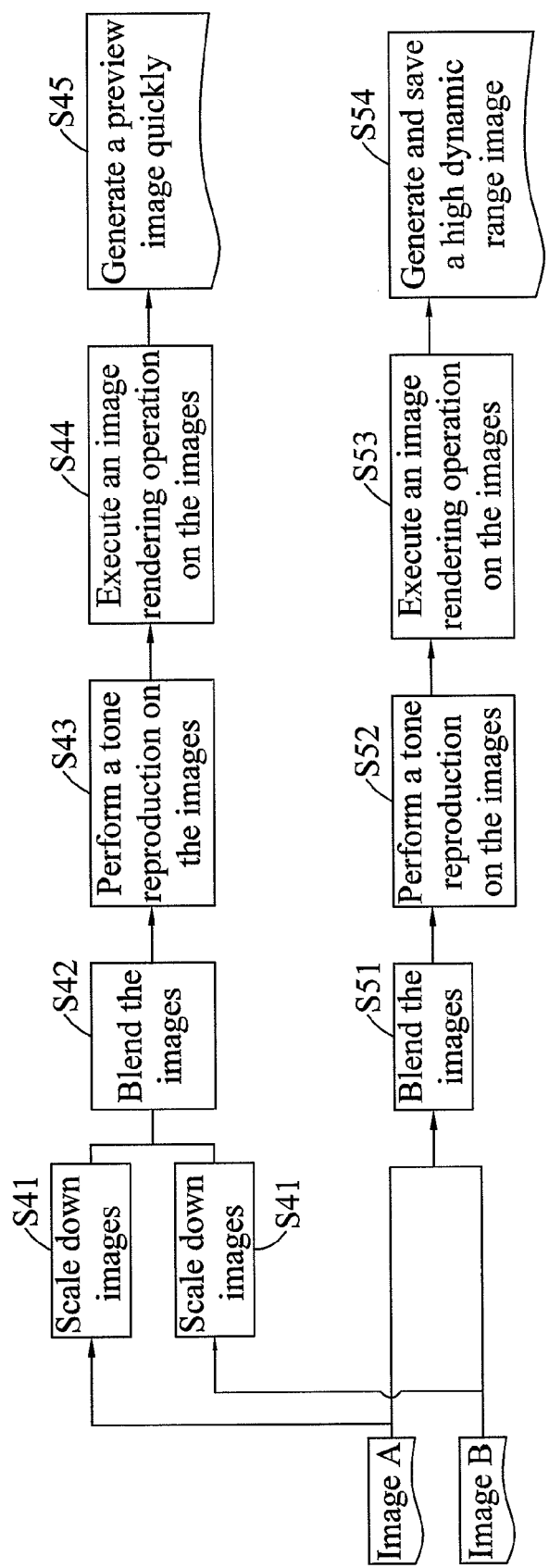
FIG. 4 is a flow chart of an image pickup device, and its image preview system and method in accordance with a preferred embodiment of the present invention.

With reference to FIG. 4 for a flow chart of an image pickup device, and its image preview system and method in accordance with a preferred embodiment of the present invention, there are an image A and an image B which are captured by the image pickup device or stored in a memory or a buffer memory of the image pickup device. Wherein, the image A and the image B have different exposure values. After the image A and the image B are obtained, the image preview system of the image pickup device will execute the following steps:

S41: Scale down the image A and the image B. For example, the image A and the image B of the original size have 4000*3000 pixels, and pixels of the image A and the image B are scaled down to 400*300 in the step S41.

S42: Blend the image A and image B, after the image A and the image B are reduced.

S43: Perform a tone reproduction operation of the blended image A and image B.

S44: Execute an image rendering operation of the image A and the image B.

S45: Generate and display a high dynamic range preview image on a display screen of the image pickup device, after the blended image A and image B are processed.

S51: Blend an image A and an image B with the original file size after the step S43 takes place (wherein the operating time is available after the images of the image preview system are blended successfully).

S52: Perform a tone reproduction operation of the image A and the image B with the original file size, after the step S43 takes place.

S53: Perform an image rendering operation of the original image A and image B, after the step S43 takes place.

S54: Generate and store an original high dynamic range image.

Therefore, the present invention scales down the size of the original image in order to generate the HDRI preview image quickly for the user's review, and blends the original images to obtain an original high dynamic range image while the users are reviewing the preview image, so as to reduce the waiting time of the user for viewing the pictures, and improve the convenience of the application.

In summation, the image pickup device and the image preview system and method of the present invention have changed the conventional image processing method by capturing a plurality of images first and reducing the images to generate a high range dynamic preview image for the users' review. When the users review the high range dynamic image, each original image is blended to generate an original high dynamic range image, so as to reduce the waiting time for the users to review the pictures.

What is claimed is:

1. An apparatus for generating a high dynamic range image, comprising:
    an image pickup module, arranged for capturing a plurality of images, wherein each of the images has a different exposure value;
    an image processing module, arranged for scaling down pixels of each image to generate a plurality of adjusted images, and blending the plurality of adjusted images, each of which has the different exposure value, to generate a preview image; and
    a display module, arranged for displaying the preview image;
    wherein, after the preview image is generated via blending and the plurality of adjusted images are displayed on the display module the image processing module blends the plurality of images, each of which has the different exposure value, to generate a high dynamic range image.

2. The apparatus of claim 1, wherein the image processing module further performs a tone reproduction operation after blending the plurality of adjusted images and generating the high dynamic range image respectively.

3. The apparatus of claim 1, wherein the image processing module further performs an image rendering operation after blending the plurality of adjusted images and generating the high dynamic range image respectively.

4. The apparatus of claim 1, further comprising a memory module for selectively storing the high dynamic range image.

5. An image processing device, applied in an apparatus for generating a high dynamic range image, comprising:
    an image adjusting module, arranged for scaling down pixels of each image to generate a plurality of adjusted images, after an image pickup module of the image pickup device captures a plurality of images, wherein each of the images has a different exposure value and each of the adjusted images has the different exposure value; and
    an image blending module, arranged for combining the plurality of adjusted images, each of which has the different exposure value, to generate a preview image to be displayed by a display module of the image pickup device;
    wherein, after the preview image is generated via blending the plurality of adjusted images by the image blending module and displayed on the display module, the plurality of images, each of which has the different exposure value, is blended to generate a high dynamic range image.

6. The image processing device of claim 5, further comprising an image tone reproduction module, for performing a tone reproduction operation, after the image blending module blends the plurality of adjusted images and generates the high dynamic range image respectively.

7. The image processing device of claim 6, further comprising an image rendering module, for performing an image rendering operation after the tone reproduction operation.

8. The image processing device of claim 5, wherein the high dynamic range image is selectively stored in a memory module of the apparatus.

9. A method for generating a high dynamic range image, comprising the steps of:

capturing a plurality of images by an image pickup module, wherein each of the images has a different exposure value;
using an image processing module to scaling down pixels of each image to generate a plurality of adjusted images, wherein each of the adjusted images has the different exposure value;
using the image processing module to blends the plurality of adjusted images of which has the different exposure value to generate a preview image; and
displaying the preview image by a display module;
wherein, after the preview image is generated via blending the plurality of adjusted images and displayed on the display module, the plurality of images, each of which has the different exposure value, is blended to generate a high dynamic range image.

10. The method of claim 9, further comprising a step of using the image processing module to perform a tone reproduction operation after the plurality of adjusted images are blended and the high dynamic range image is generated respectively.

11. The method of claim 9, further comprising a step of using the image processing module to perform an image rendering operation after the plurality of adjusted images are blended and the high dynamic range image is generated respectively.

12. The method of claim 9, further comprising a step of selectively storing the high dynamic range image by a memory module.

* * * * *